(12) United States Patent
Uchida

(10) Patent No.: US 7,486,754 B2
(45) Date of Patent: Feb. 3, 2009

(54) SYSTEM CLOCK DISTRIBUTING APPARATUS AND SYSTEM CLOCK DISTRIBUTING METHOD

(75) Inventor: Nobuo Uchida, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 483 days.

(21) Appl. No.: 11/116,392

(22) Filed: Apr. 28, 2005

(65) Prior Publication Data
US 2006/0153325 A1 Jul. 13, 2006

(30) Foreign Application Priority Data
Jan. 12, 2005 (JP) ............................. 2005-004662

(51) Int. Cl.
*H04L 7/00* (2006.01)
(52) U.S. Cl. ...................... 375/356; 375/354; 375/260; 713/400; 713/500; 713/503
(58) Field of Classification Search ................. 375/356, 375/354, 260; 713/400, 500, 502, 503, 600
See application file for complete search history.

(56) References Cited
U.S. PATENT DOCUMENTS

| | | | | |
|---|---|---|---|---|
| 5,058,132 A | * | 10/1991 | Li | ............................... 375/260 |
| 5,307,381 A | * | 4/1994 | Ahuja | ......................... 375/356 |
| 6,289,067 B1 | * | 9/2001 | Nguyen et al. | ............... 375/372 |
| 6,366,148 B1 | | 4/2002 | Kim | |
| 6,813,721 B1 | * | 11/2004 | Tetreault et al. | .............. 713/400 |
| 7,003,062 B1 | * | 2/2006 | Leyn | ........................... 375/362 |

FOREIGN PATENT DOCUMENTS

| | | |
|---|---|---|
| JP | 63-293620 | 11/1988 |
| JP | 07-281785 | 10/1995 |
| JP | 09-233060 | 9/1997 |
| JP | 10-161769 | 6/1998 |
| KR | 2001-0048662 | 6/2001 |

* cited by examiner

*Primary Examiner*—Phuong Phu
(74) *Attorney, Agent, or Firm*—Staas & Halsey LLP

(57) ABSTRACT

To provide a system clock distributing apparatus and a system clock distributing method for reducing a skew of a system clock and a synchronizing signal at low cost. The system clock distributing apparatus for matching the timing of data by using the synchronizing signal includes an oscillator 1 that generates a periodical synchronizing signal and a PLL 2, a memory that stores the data, at least one CPU 13 that conducts a computing process using the data stored in the memory, at least one MAC 14 that controls an access from the CPU 13 to the memory, and at least one NB 12 that generates the system clock having a frequency that is an integral multiple of the synchronizing signal, and controls the CPU 13 and the MAC 14 based on the operation by the system clock.

3 Claims, 4 Drawing Sheets

SYSTEM CLOCK DISTRIBUTING APPARATUS AND SYSTEM CLOCK DISTRIBUTING METHOD

BACKGROUND OF THE INVENTION

1. Field of the Invention

The present invention relates to a system clock distributing apparatus and a system clock distributing method for controlling a clock generation for a data transmission in a multiprocessor system.

2. Description of Related Art

Multiprocessor server systems have been developed is advanced in recent server systems, and there is a trend toward the further larger scale systems. In such a multiprocessing system, a data transmission except an IO system is required to be a high throughput and low latency in order to speed up a computing process. In view of this demand, it is a key not to use a serial transmission that is generally used in a recent high speed IO, but to transmit a large amount of units of data in a line and to make a transmission side chip and a reception side chip synchronously transmit data in a certain range.

Here, an inter-chip data transmission unit for performing a data transmission between chips will be described. FIG. 4 is a block diagram showing an example of a construction of the inter-chip data transmission unit. The inter-chip data transmission unit has a transmission side chip 130 and a reception side chip 140. The reception side chip 140 has a data writing unit 141, a ring buffer 142, and a data reading unit 143. The same system clock and synchronizing signal are supplied from an external unit to the transmission side chip 130 and the reception side chip 140.

The transmission side chip 130 transmits an inputted system clock as a writing clock to the reception side chip 140, latches the inputted synchronizing signal and the transmitting data with respect to the system clock, and transmits the inputted synchronizing signal and the transmitting data to the reception side chip 140. The data writing unit 141 writes the data from the transmission side chip 130 to the ring buffer 142 at the timing of the writing clock. The data writing unit 141 resets a writing pointer for designating a writing position according to the synchronizing signal from the transmission side chip 130 latched by the writing clock, and instructs the ring buffer 142. The data reading unit 143 reads out the data of the ring buffer 142 at the timing of the system clock. The data reading unit 143 resets the reading pointer for designating a reading position according to the synchronizing signal from an external unit latched by the system clock, and instructs the ring buffer 142.

According to the above-mentioned inter-chip data transmission unit, accurate writing can be performed by sending, from the transmission side chip 130 to the reception side chip 140, the writing clock with the synchronizing signal and the data, and accurate reading can be performed by sending the system clock and the synchronizing signal from the external unit to the transmission side chip 130 and the reception side chip 140.

Next, in the case where the above-mentioned inter-chip data transmission unit is applied to a multiprocessor system, a distribution of the system clock and the synchronizing signal to the respective chips on each substrate will specifically be described. FIG. 5 is a block diagram showing an example of a construction of a system clock distributing apparatus in a conventional multiprocessor system. FIG. 5 shows only a connection relating to the clock and the synchronizing signal. This system clock distributing apparatus has an oscillator 1, a PLL (Phase Locked Loop) 102, a clock distributor 103, a plurality of system boards 104, a crossbar board 105, and a back plane 6. The system clock (period T) and the synchronizing signal (period nT) are generated by the PLL 102 on the basis of the signal generated from the oscillator 1, and distributed from the clock distributor 103 to the system board 104 and the crossbar board 105 through the back plane 6.

FIG. 6 is a block diagram showing an example of a construction of a conventional system board. FIG. 6 shows only a connection relating to the clock and the synchronizing signal. The system board 104 has a clock regulator 111, an NB (north bridge) 112, a plurality of CPUs (Central Processing Unit) 113, and a plurality of MACs (Memory Access Controller) 114. The clock regulator 111 receives the system clock and the synchronizing signal from the clock distributor 103, regulates a delay time of the system clock by using the synchronizing signal, and distributes the system clock and the synchronizing signal to the NB 112 and the plurality of MACs 114. The NB 112 controls communication with the CPUs 113, the MACs 114, and other NBs, and distributes the system clock and the synchronizing signal received from the clock regulator 111 to the CPU 113. The CPU 113 accesses to a memory (not shown) connected to each MAC 114, and conducts a computing process. The MAC 114 controls an access from the CPU 113 to the memory.

FIG. 7 is a block diagram showing an example of a construction of a conventional crossbar board. FIG. 7 shows only a connection relating to the clock and the synchronizing signal. The crossbar board 105 has a clock regulator 121, and a plurality of XBs (Cross Bar) 122. The clock regulator 121 receives the system clock and the synchronizing signal from the clock distributor 103, regulates a delay time of the system clock by using the synchronizing signal, and distributes the system clock and the synchronizing signal to the plurality of XBs 122. The XB 122 connects between the NB 112.

In a system for sending simultaneously the system clock and the synchronizing signal from the clock distributor 103 as described above, when a skew, that is a deviation of the delay time in the system clock and the synchronizing signal increases, a normal operation cannot be conducted. Therefore, firstly, lengths of wirings are equalized from the clock distributor 103 to each chip. Since unevenness of an element, a substrate, or the like exists, it is difficult to suppress the skew of the clock of high frequency only by the equalization of the lengths. If the frequency of the system clock is low, the reduction in the skew is easy, however the system clock is a central clock of a server, and hence a high frequency is required. Then, to further reduce the skew, the clock regulators 111 and 121 on each substrate regulate the delay time by giving a delay amount set at each route from the outside to the system clock and the synchronizing signal.

As a conventional art relating to the present invention, for example, Patent reference 1 shown below is known. This clock supply system operates an LSI in a substrate by using a global clock supplied from an outside source instead of the local clock in the substrate. The substrate can be operated even when the global clock is cut off due to an accident, or at the time of a test of a single substrate.

[Patent Reference 1]

Japanese Patent Application Laid-Open Publication No. 9-233060 (Pages 3-5, FIG. 1)

However, since the clock regulators 111, 121 are required to operate as fast as other chips and are a special purpose chip, manufacturing cost of the apparatus becomes very high. Further, since it is necessary to externally adjust the delay time for each route, man-hour becomes very large. Therefore, even if the skew is suppressed to certain degree, its cost demerit is large. Furthermore, even if the adjustment is executed, it might not fall always within an adjustable range, resulting in a lowering of the go-through rate.

SUMMARY OF THE INVENTION

The present invention is made to overcome the above-mentioned problems, and has an object of providing a system clock distributing apparatus and a system clock distributing method for reducing a skew of a system clock and a synchronizing signal at low cost.

In order to solve the above, a system clock distributing apparatus according to an aspect of the present invention for matching a timing of data by using a synchronizing signal, comprises: a synchronizing signal generator that generates a periodical synchronizing signal; a memory that stores the data; at least one processor that conducts a computing process using the data stored in the memory; at least one memory access controller that controls an access from the processor to the memory; and at least one controller that generates an internal clock having a frequency that is an integral multiple of the synchronizing signal based on the synchronizing signal and controls the processor and the memory access controller based on an operation by the internal clock.

The system clock distributing apparatus according to the present invention, wherein the controller further outputs the synchronizing signal to the processor, and the processor generates an internal clock having a frequency that is an integral multiple of the synchronizing signal based on the synchronizing signal from the controller, and performs the operation by the internal clock.

The system clock distributing apparatus according to the present invention, wherein the memory access controller generates an internal clock having a frequency that is an integral multiple of the synchronizing signal based on the synchronizing signal, and performs the operation by the internal clock.

The system clock distributing apparatus according to the present invention further includes at least one crossbar that generates an internal clock having a frequency that is an integral multiple of the synchronizing signal based on the synchronizing signal, and controls a communication among a plurality of the controllers based on an operation by the internal clock.

A multiprocessor system controller according to another aspect of the present invention comprises an internal clock generator that generates an internal clock having a frequency that is an integral multiple of an external clock based on the external clock, and a multiprocessor system controller that controls an external processor and an external memory access controller based on an operation by the internal clock.

A processor according to another aspect of the present invention comprises an internal clock generator that generates an internal clock having a frequency that is an integral multiple of an external clock based on the external clock; and a processor that conducts a computing process using data stored in an external memory based on an operation by the internal clock.

A memory access controller according to another aspect of the present invention comprises an internal clock generator that generates an internal clock having a frequency that is an integral multiple of an external clock based on the external clock; and a memory access processor that controls an access to an external memory based on an operation by the internal clock.

A crossbar according to another aspect of the present invention comprises: an internal clock generator that generates an internal clock having a frequency that is an integral multiple of an external clock based on the external clock; and a crossbar processor that controls a communication among a plurality of multiprocessor system controllers based on an operation by the internal clock.

A system clock distributing method according to still another aspect of the present invention for matching a timing of data using a synchronizing signal comprising: a synchronizing signal generating step that generates a periodical synchronizing signal; a memory step that stores the data; at least one processing step that conducts a computing process using the data stored in the memory; at least one memory access control step that controls an access from the processing step to the memory step; and a plurality of control steps that generates an internal clock having a frequency that is an integral multiple of the synchronizing signal based on the synchronizing signal and control the processing step and the memory access control step based on an operation by the internal clock.

Further, in the system clock distributing method according to the present invention, the control step is adapted to output the synchronizing signal to the processing step, the processing step is adapted to generate an internal clock having a frequency that is an integral multiple of the synchronizing signal based on the synchronizing signal from the control step, and perform the operation by the internal clock.

Further, in the system clock distributing method according to the present invention, the memory access control step is adapted to generate an internal clock having a frequency that is an integral multiple of the synchronizing signal based on the synchronizing signal, and perform the operation by the internal clock.

Furthermore, the system clock distributing method according to the present invention further comprising: at least one communication control step that generates the internal clock having a frequency that is an integral multiple of the synchronizing signal based on the synchronizing signal, and controls a communication among a plurality of multiprocessor system controllers based on the operation by the internal clock.

Note that, the processing unit is a CPU in the embodiment. The controller and the multiprocessor system controller are an NB in the embodiment. The internal clock generator is a PLL in the embodiment. The external clock is a synchronizing signal in the embodiment. The internal clock is a system clock in the embodiment.

According to the present invention, since it is not necessary to use the clock distributor and the clock regulator that operate at high speed and are a special purpose chip, cost reduction can be achieved. A process of externally setting an amount of delay for each route can be omitted, and a lowering of the go-through rate due to not falling within the adjustable range can be prevented. Further, according to the invention, only the synchronizing signal is distributed, thus the number of signals can be reduced. In addition, since the high speed system clock is not distributed, a bottle neck of a transmission speed due to the transmission characteristics of the high speed system clock can be eradicated.

DETAILED DESCRIPTION OF THE PREFERRED EMBODIMENTS

An embodiment of the present invention will be described below with reference to accompanying drawings.

Figure 1:
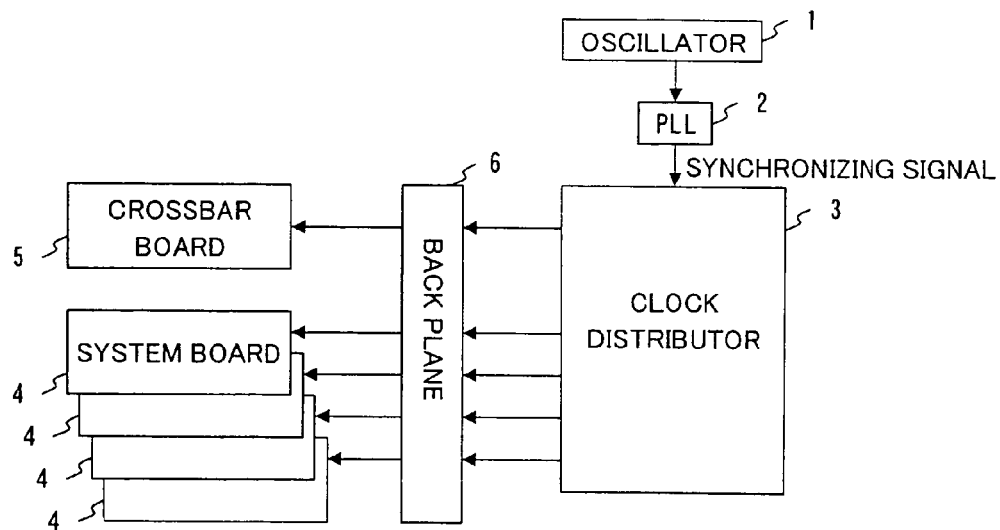
FIG. 1 is a block diagram showing an example of a construction of a system clock distributing apparatus in a multiprocessor system according to the present invention.
Figure 4:
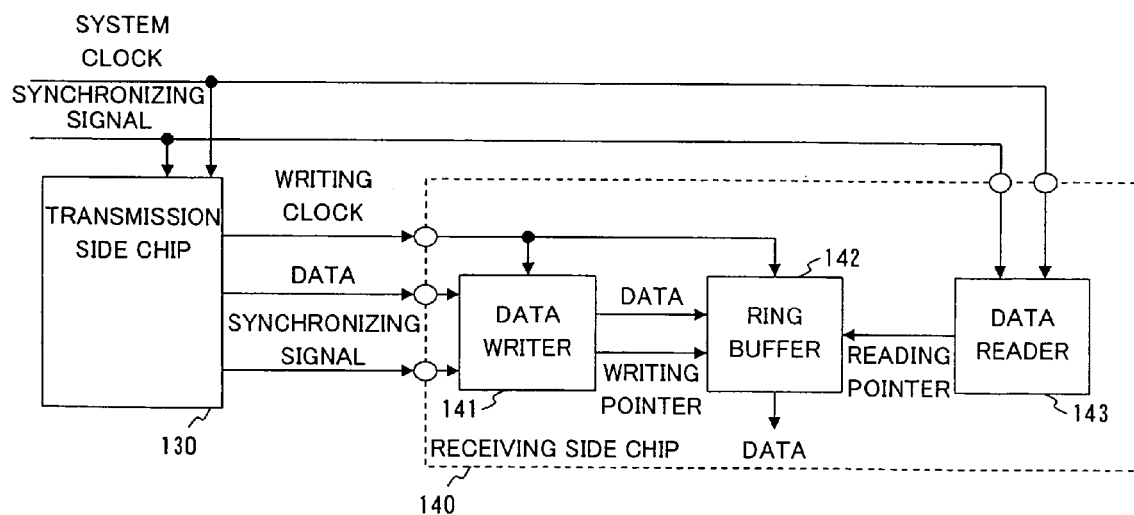
FIG. 4 is a block diagram showing an example of a construction of an inter-chip data transmission unit.
Figure 5:
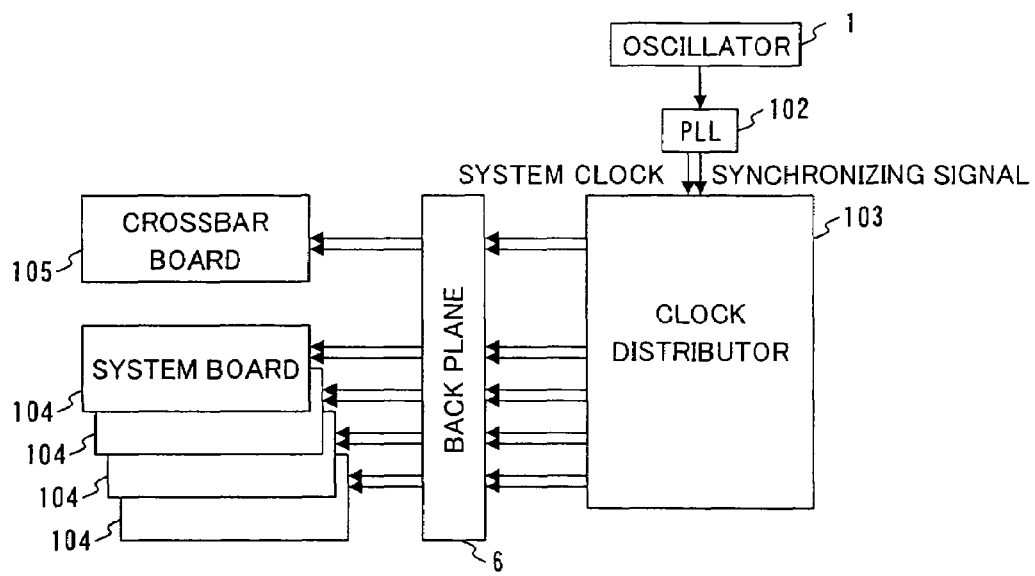
FIG. 5 is a block diagram showing an example of a construction of a system clock distributing apparatus in a conventional multiprocessor system.

In the case that an inter-chip data transmission unit as shown in FIG. 4 is applied to a multiprocessor system, a distribution of a system clock and a synchronizing signal to each chip on each substrate will be particularly described. FIG. 1 is a block diagram showing an example of a construction of a system clock distributing apparatus in a multiprocessor system according to the present invention. In FIG. 1, the same reference numerals as those in FIG. 5 designate the same as or equivalent to those shown in FIG. 5, and the description will be omitted. The system clock distributing apparatus of FIG. 1 has, as compared with FIG. 5, a PLL 2 instead of a PLL 102, a clock distributor 3 instead of a clock distributor 103, a system boards 4 instead of system boards 104, and a crossbar board 5 instead of a crossbar board 105. A synchronizing signal (period nT) is generated by the PLL 2 based on a signal generated from an oscillator 1, and distributed from the clock distributor 3 to the system board 4 and the crossbar board 5 through a back plane 6.

Figure 2:
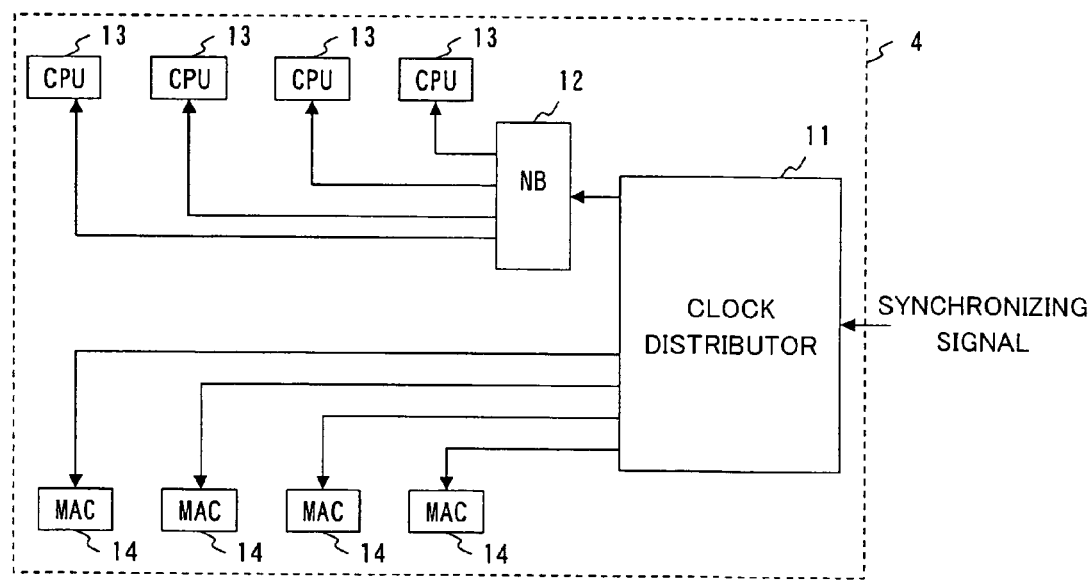
FIG. 2 is a block diagram showing an example of a construction of a system board according to the present invention.
Figure 6:
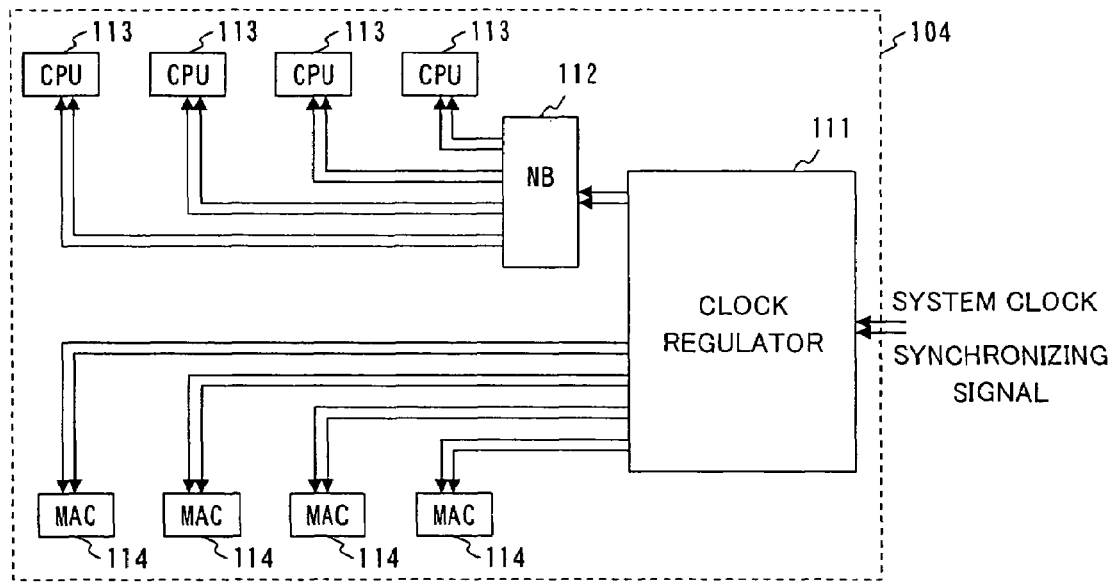
FIG. 6 is a block diagram showing an example of a construction of a conventional system board.

FIG. 2 is a block diagram showing an example of a construction of a system board according to the present invention. The system board 4 has, as compared with FIG. 6, a clock distributor 11 instead of a clock regulator 111, an NB 12 instead of an NB 112, CPUs 13 instead of a CPUs 113, and MACs 14 instead of MACs 114. The clock distributor 11 distributes the synchronizing signal inputted from the clock distributor 3 to the plurality of MACs 14. The NB 12 is different, as compared with the NB 112, at a point of distributing the synchronizing signal inputted from the clock distributor 3 to the plurality of CPUs 13.

Figure 3:
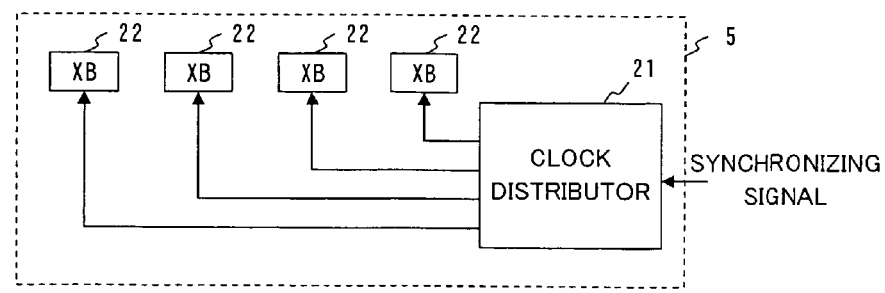
FIG. 3 is a block diagram showing an example of a construction of a crossbar board according to the present invention.
Figure 7:
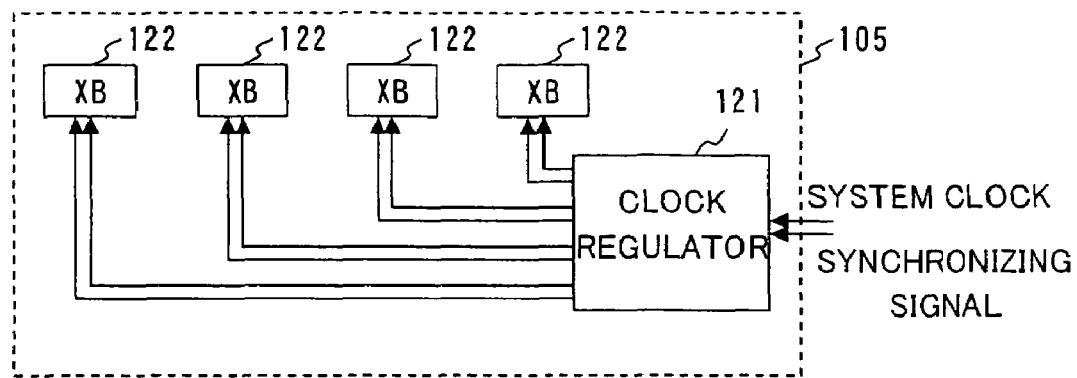
FIG. 7 is a block diagram showing an example of a construction of a conventional crossbar board.

FIG. 3 is a block diagram showing an example of a construction of the crossbar board according to the present invention. The crossbar board 5 has, as compared with FIG. 7, a clock distributor 21 instead of a clock regulator 121, and XBs 22 instead of XBs 122. The clock distributor 21 distributes the synchronizing signal inputted from the clock distributor 3 to the plurality of XBs 22.

Here, the NB 12, the CPU 13, the MAC 14 and the XB 22 each have a PLL for dividing the inputted signal by n times, generate a system clock of period T from the inputted synchronizing signal of period nT, and operate by using the synchronizing signal and the system clock. This PLL has characteristics which can assure the phase of the outputted system clock if the phase of the synchronizing signal of the reference clock matched between the chips.

As has been described above, the system clock distributing apparatus according to the present invention does not distribute the system clock to each chip, but distributes only the synchronizing signal to each chip. Since the skew between the synchronizing signals is not critical, and the synchronizing signals have lower frequency as compared with that of the system clock, problems of the transmission characteristics are little. Therefore, as compared with the conventional system clock distributing apparatus for transmitting the system clock through a long transmission line having large variation between individuals, the system clock distributing apparatus according to the present invention can easily match the phase of the system clock with the phase of the synchronizing signal.

What is claimed is:

1. A system clock distributing apparatus for matching a timing of data by using a synchronizing signal, comprising:
   a synchronizing signal generator that generates a periodical synchronizing signal;
   a memory that stores the data;
   at least one processor that conducts a computing process using the data stored in the memory;
   at least one memory access controller that controls an access from the processor to the memory; and
   at least one controller that generates an internal clock having a frequency that is an integral multiple of the synchronizing signal based on the synchronizing signal and controls the processor and the memory access controller based on an operation by the internal clock, wherein
   the controller further outputs the synchronizing signal to the processor, and
   the processor generates an internal clock having a frequency that is an integral multiple of the synchronizing signal based on the synchronizing signal from the controller, and performs the operation by the internal clock.

2. The system clock distributing apparatus according claim 1, wherein the memory access controller generates an internal clock having a frequency that is an integral multiple of the synchronizing signal based on the synchronizing signal, and performs the operation by the internal clock.

3. The system clock distributing apparatus according claim 1, further comprising:
   at least one crossbar that generates an internal clock having a frequency that is an integral multiple of the synchronizing signal based on the synchronizing signal, and controls a communication among a plurality of the controllers based on an operation by the internal clock.

* * * * *

UNITED STATES PATENT AND TRADEMARK OFFICE
CERTIFICATE OF CORRECTION

PATENT NO. : 7,486,754 B2  Page 1 of 1
APPLICATION NO. : 11/116392
DATED : February 3, 2009
INVENTOR(S) : Nobuo Uchida It is certified that error appears in the above-identified patent and that said Letters Patent is hereby corrected as shown below:

Column 6, Line 43, Change "according claim" to --according to claim--.

Column 6, Line 48, Change "according claim" to --according to claim--.

Signed and Sealed this

Twenty-first Day of April, 2009

JOHN DOLL
*Acting Director of the United States Patent and Trademark Office*